A. J. BROWN & R. B. WILLIAMSON.
COIL SUPPORT.
APPLICATION FILED SEPT. 6, 1910.
1,123,085.
Patented Dec. 29, 1914.
2 SHEETS—SHEET 1.
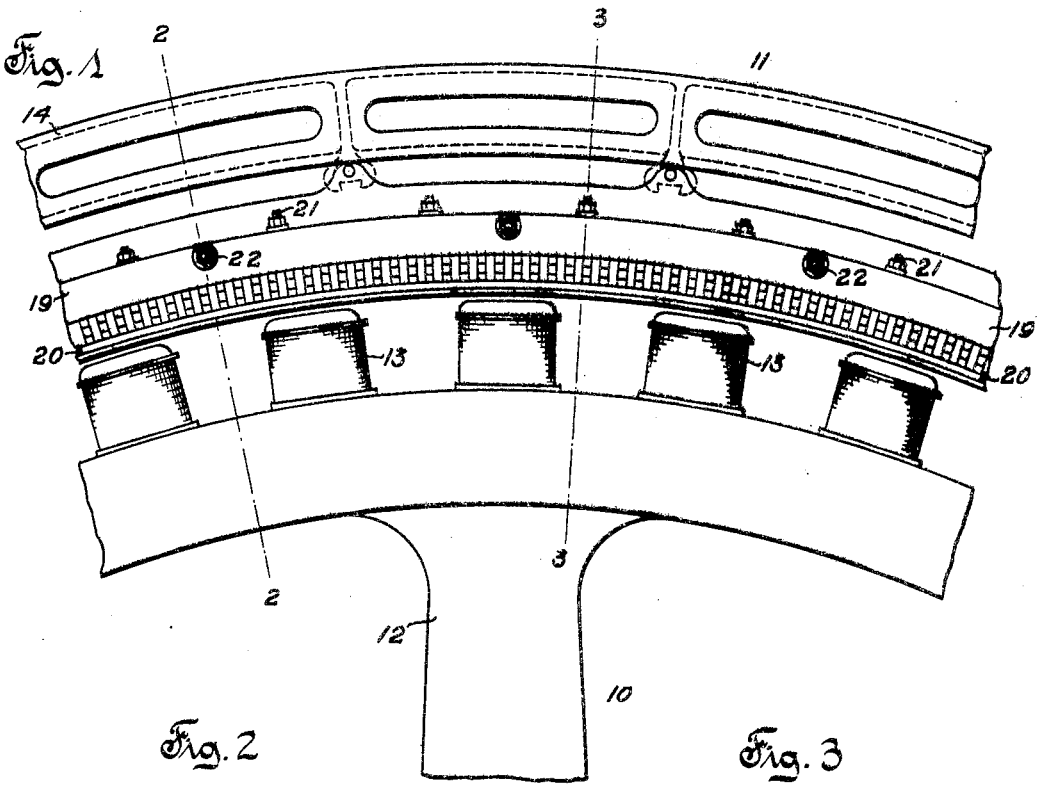
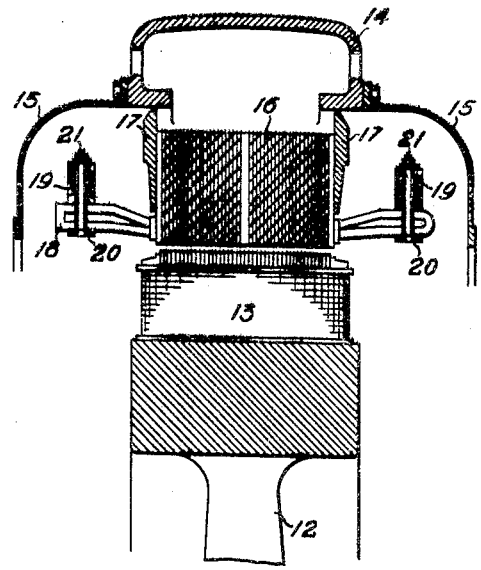
Witnesses
Rob. E. Holt
Chas. L. Byron
Inventors
Arthur J. Brown
Robert B. Williamson
By Chas. E. Lord
Attorney

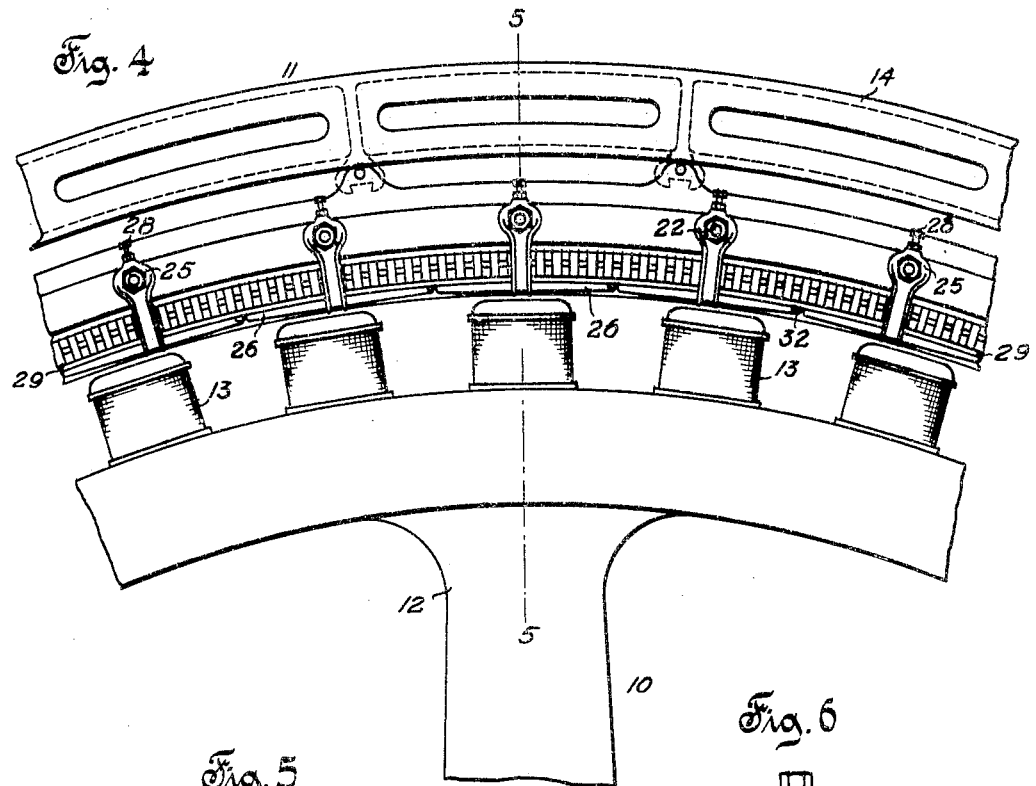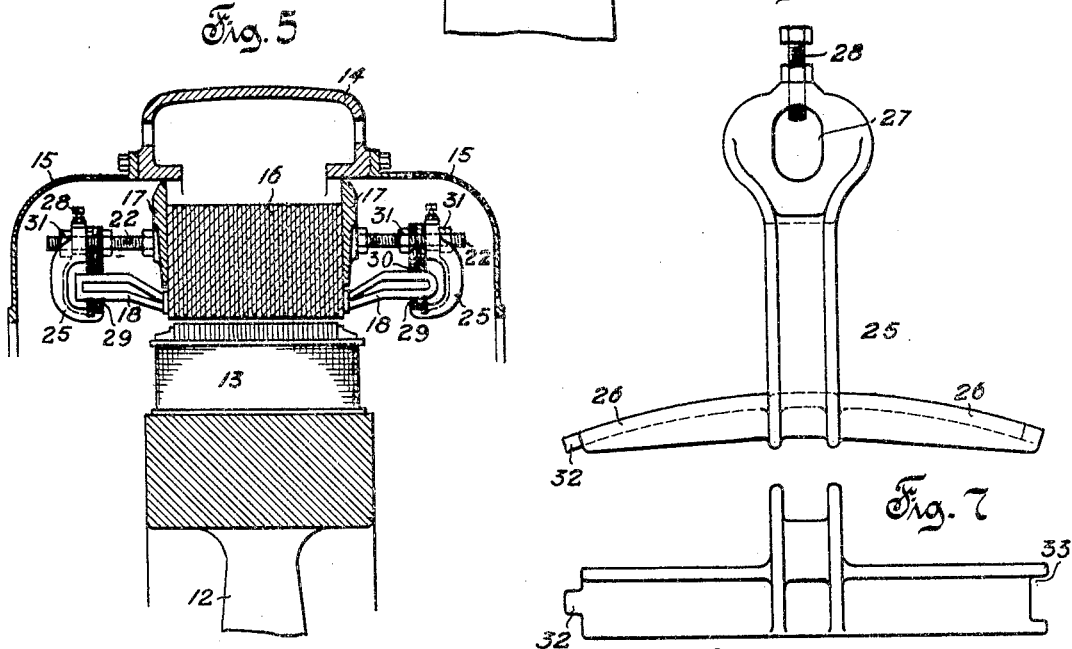

UNITED STATES PATENT OFFICE.

ARTHUR J. BROWN AND ROBERT B. WILLIAMSON, OF MILWAUKEE, WISCONSIN, ASSIGNORS, BY MESNE ASSIGNMENTS, TO ALLIS-CHALMERS MANUFACTURING COMPANY, A CORPORATION OF DELAWARE.

COIL-SUPPORT.

1,123,085.  Specification of Letters Patent.  Patented Dec. 29, 1914.

Application filed September 6, 1910. Serial No. 580,490.

*To all whom it may concern:*

Be it known that we, ARTHUR J. BROWN and ROBERT B. WILLIAMSON, citizens of the United States, and residents of Milwaukee, in the county of Milwaukee and State of Wisconsin, have invented certain new and useful Improvements in Coil-Supports, of which the following is a full, clear, and exact specification.

Our invention relates to dynamo-electric machines, and particularly to means for supporting and bracing the end turns of stator coils.

In large dynamo-electric machines, such as alternating current generators and motors, the end turns of the stator coils extend outwardly a considerable distance on each side of the stator core. When the machines are in operation, especially when under heavy loads the end turns of the coils if unsupported or unbraced are subject to constant and severe vibration, which, if allowed to continue for a considerable time, destroys the insulation, causing the windings to be burned out. There are also other reasons why it is necessary to support the projecting end turns of stator coils. Furthermore, we have found it advantageous to make the supports or bracing members adjustable so that the same size and type of support can be used on machines of different sizes and that the points at which the end turns are supported may be changed at will. Again, a machine may be rewound having end turns projecting a greater or less amount than formerly, and in this case it would be necessary to provide new supports unless an adjustable support had been provided in the first place.

It is the object of this invention to provide novel means whereby the stator end turns or connectors may be supported, and especially adjustably supported.

The various novel features of our invention will be described in the specification and set forth in the appended claims.

Our invention is illustrated in the accompanying sheet of drawings, in which—

Figure 1 is a fragmentary elevation of the stationary and rotating members of a dynamo-electric machine embodying our invention; Fig. 2 is a partial sectional view taken along the line 2—2 of Fig. 1; Fig. 3 is a similar view taken along the line 3—3 of Fig. 1; Fig. 4 is a fragmentary elevation of the stationary and rotating member of a dynamo-electric machine embodying a modification of our invention. Fig. 5 is a sectional view taken along the line 5—5 of Fig. 4; and, Figs. 6 and 7 are enlarged elevations of the bracing members employed in the modification of our invention.

A portion of the rotary spider 10 and a portion of the armature 11 of an alternating current generator have been shown, but we wish it to be understood, however, that our invention is not limited to a dynamo-electric machine of this type.

The rotor consists of a spider 12 having radial poles 13. The armature comprises a frame 14 having end shields 15 and a core 16 held between end heads 17. Located in the slots of the core are the usual armature windings having end turns or end connections 18.

Referring more particularly to Figs. 1, 2, and 3, it is seen that surrounding and in engagement with the end turns at each end of the machine is a laminated ring 19, of insulating material or having the coil engaging portion thereof of insulating material, and located between the end turns and the rotor and concentric with each outer ring 19 is a second flexible insulating ring 20. Both of these rings may consist of sections, the number of which depends on the size of the machine.

The rings 19 and 20 at each end of the machine are drawn together by bolts 21, which pass between the conductors through both of said rings. Thus the end turns are clamped tightly between the rings 19 and 20.

Extending outwardly from the ends of the stator and secured to the end heads 17 by having their end portions threaded therein are a number of studs or supporting members 22, each of which is provided with a threaded portion 23 and passes through the insulating rings 19.

Located on the studs 22 on each side of the insulating rings 19 are nuts 24 for the purpose of clamping the insulating rings 19 and also for shifting or adjusting their position.

By using a structure such as this, coils of any length may be used, and if it is desired to change the coils of the machine and put in longer or shorter ones the same supporting means may be adapted to the particular use by moving the rings 19 and 20 axially of the machine by rotating the nuts 24. In this particular arrangement the insulating rings have been drawn together by bolts 21 and the rings connected and supported by the studs 22 at points circumferentially spaced and between the points at which the bolts 21 are located.

In a modification of this invention, we have provided segmental bracing members 25 to take the place of the bolts 21. These bracing plates 25 are preferably hook shaped and the end of the hooks provided with a long body portion 26, which extends circumferentially of the machine and upon which the end turns 18 rest, the other part of the hook extending radially. The other end of the retaining members are provided with elongated openings 27 which receive the studs 22. This end of the retaining member is also provided with a tapped portion for the reception of a set or adjusting screw 28, by means of which the retaining members may be clamped and also adjusted radially of the machine, thereby drawing up or lowering the end turns of the stator winding. Interposed between the body portion 26 of the retaining member and the end turns is a flexible insulating ring 29. Supported by the studs 22 and interposed between said studs and the end turns 18 is preferably another insulating ring 30. As in the first case, the insulating rings are adapted to be shifted axially of the machine to change the point at which the end turns are supported. The bracing members 25 are adapted to be shifted at the same time that the insulating supporting rings are, thereby providing bracing means which has an axial and also a radial adjustment. As in the first case, the axial adjustment is accomplished by moving the nuts 31 lengthwise of the studs 22.

At one end of each of the body portions 26 of the bracing members is a tongue or projection 32 which engages a slotted or grooved portion 33 in the body portion of the adjacent bracing member. It is therefore seen that each bracing member has at one end of its body portion a tongue or projection 32 and a slotted or grooved portion at its other end. When all of the bracing plates are set in position and adjusted properly, each slotted or grooved portion 33 has locked within it a tongue or projection of its adjacent bracing member. In this way a flexible support is provided for the end turns of the stator winding and one which is capable of radial and axial adjustment.

This means of supporting the end-turns of the stator winding is simple and inexpensive and at the same time is durable and can be relied upon under all conditions of operation.

It is evident that there may be many modifications of the precise form and arrangement here shown and described, and we aim in our claims to cover all such modifications which do not depart from the spirit and scope of our invention.

What we claim as new is:

1. In a dynamo-electric machine, a stator having a laminated core, end heads for retaining said core, windings on said core having extending end portions, supports secured to said end heads, and means held in operative position through the medium of said supports and having both radial and axial adjustment relative to said end heads and effective in adjusted position to secure said end portions.

2. In a dynamo-electric machine, a core provided with a winding having extending end portions, means for supporting and securing said end portions relatively to said core, said means having both radial and axial adjustment to provide a plurality of effective securing positions therefor.

3. In a dynamo-electric machine, the combination of a stator having a laminated core and a winding with end-turns, end heads supporting said core, means for supporting said end-turns relatively to said core comprising members secured to said end heads and extending outwardly therefrom, and interfitting tongue and groove members axially adjustable and supported from said outwardly extending members.

4. In a dynamo-electric machine, the combination of a stator comprising a housing, a laminated core having a winding with end turns, said core supported by said housing, end-heads holding said laminated core in position, members projecting from said end-heads, and radially and axially adjustable bracing members having interfitting tongue and grooved portions and for supporting the end turns of said winding, some of said bracing members being mounted on said projecting members.

5. In a dynamo-electric machine, the combination of a stator comprising a core and a winding therefor having end-turns, and means for supporting said end-turns including segmental members adapted to engage the radially inner side of said end-turns and having radial extensions supported from said core, said segmental members being relatively adjustable.

6. In a dynamo-electric machine, the combination of a stator having a laminated core, end-heads for retaining said laminated core, windings having end turns, and carried by said core, studs secured to and projecting from said end-heads, and a plurality of bracing members having interfitting tongue and grooved portions and adjustably mounted on said studs for retaining the end-turns of said winding, said bracing members being circumferentially spaced on the radially inner side of said end-turns.

7. In a dynamo-electric machine, the combination of a stator core, windings having end-turns and carried by said core, end-heads retaining said core in position, members secured to and extending outwardly from said end-heads, a bracing member comprising tongue and grooved segmental portions mounted on said outwardly extending members to retain in position the end-turns of said winding, and means for adjusting said bracing members radially and axially of the machine.

8. In a dynamo-electric machine, the combination of a stator having a core provided with windings with end turns, interfitting bracing members having hook-shaped portions circumferentially spaced for retaining said end-turns in any desirable position, and supporting members upon which said bracing members are adjustably mounted.

9. In a dynamo-electric machine, the combination of a stator comprising a core having coils with projecting end-turns bracing members having radially and circumferentially extending portions for holding the end turns of said coils in any desired position, and supporting members upon which said bracing members are radially and axially adjustable, said circumferentially extending portions having tongue and grooved portions for fitting into and receiving respectively the grooved and tongue portions of adjacent bracing members.

10. In a dynamo-electric machine, the combination of a stator having a core provided with a winding having end turns, and interfitting hook-shaped members in which said end turns are secured.

11. In a dynamo-electric machine, the combination of a winding having end turns, and a plurality of interfitting bracing members each having a hook-shaped portion in which the outer portions of said end turns are secured.

12. In a dynamo-electric machine, the combination of a winding having end turns, and circumferentially spaced interfitting members having hook-shaped portions in which said end turns are secured.

13. In a dynamo-electric machine, the combination of a winding having end turns, and circumferentially spaced interfitting members supported radially outward with respect to said end turns and having hook-shaped portions looping around the outer portions of said end turns to support said end-turns.

14. In a dynamo-electric machine, a frame, a core supported thereby, said core provided with a winding having end portions extending beyond said core, and means for supporting the end portions in fixed position relative to said core comprising members having both radial and axial adjustment.

In testimony whereof we affix our signatures, in the presence of two witnesses.

ARTHUR J. BROWN.
ROBERT B. WILLIAMSON.

Witnesses:
CHAS. L. BYRON,
ROB. E. STOLL,